(12) United States Patent
Hattass et al.

(10) Patent No.: US 9,346,215 B2
(45) Date of Patent: May 24, 2016

(54) DEVICE, ARRANGEMENT AND METHOD FOR CONNECTING LINES, MOTOR VEHICLE INCLUDING SUCH A DEVICE OR ARRANGEMENT, RESPECTIVELY

(75) Inventors: Dirk Hattass, Gründau (DE); Volker Naumann, Leipzig (DE); Peter Kahn, Erlensee (DE)

(73) Assignee: Veritas AG, Gelnhausen (DE)

( * ) Notice: Subject to any disclaimer, the term of this patent is extended or adjusted under 35 U.S.C. 154(b) by 790 days.

(21) Appl. No.: 13/305,567

(22) Filed: Nov. 28, 2011

(65) Prior Publication Data

US 2012/0066904 A1 Mar. 22, 2012

Related U.S. Application Data

(62) Division of application No. 11/235,088, filed on Sep. 27, 2005, now Pat. No. 8,109,688.

(30) Foreign Application Priority Data

Sep. 27, 2004 (DE) .................. 10 2004 046 797

(51) Int. Cl.
*B29C 65/06* (2006.01)
*B23K 20/12* (2006.01)
*B29C 65/00* (2006.01)
*F16L 47/02* (2006.01)

(52) U.S. Cl.
CPC ............ *B29C 65/0672* (2013.01); *B23K 20/12* (2013.01); *B29C 65/0627* (2013.01); *B29C 66/12441* (2013.01); *B29C 66/12461* (2013.01); *B29C 66/12469* (2013.01); *B29C 66/322* (2013.01); *B29C 66/342* (2013.01); *B29C 66/5221* (2013.01); *B29C 66/52291* (2013.01); *B29C 66/972* (2013.01); *F16L 47/02* (2013.01); *B23K 2201/06* (2013.01); *B29C 66/5344* (2013.01); *Y10T 29/49194* (2015.01); *Y10T 403/47* (2015.01); *Y10T 403/473* (2015.01)

(58) Field of Classification Search
USPC .......................................... 228/2.1, 2.3, 112.1
See application file for complete search history.

(56) References Cited

U.S. PATENT DOCUMENTS 3,980,248 A 9/1976 Minoshima
4,047,739 A 9/1977 Aitken
(Continued)

FOREIGN PATENT DOCUMENTS

DE 38 34 080 C2 4/1990
DE 199 17 071 C2 10/2000
(Continued)

OTHER PUBLICATIONS

Search Report mailed Jul. 27, 2009 (and machine translation of the same) for European Patent Application No. EP05019993.
(Continued)

*Primary Examiner* — Devang R Patel
(74) *Attorney, Agent, or Firm* — Buchanan Ingersoll & Rooney PC

(57) ABSTRACT

The invention relates to an device for connecting lines, especially to a quick connector, comprising at least one connector adapted to be joined with a line end by means of friction welding. A controlled release of excess melt is achieved by that the connecting device is provided with means for withdrawing the melt producible by the friction welding from the its area of the origin.

15 Claims, 3 Drawing Sheets

(56) References Cited

U.S. PATENT DOCUMENTS

| | | | |
|---|---|---|---|
| 5,215,614 | A | 6/1993 | Wijkamp et al. |
| 6,000,482 | A | 12/1999 | Michalski |
| 6,199,916 | B1 | 3/2001 | Klinger et al. |
| 2005/0285393 | A1 | 12/2005 | Hatass et al. |
| 2008/0012309 | A1 | 1/2008 | Blivet et al. |

FOREIGN PATENT DOCUMENTS

| | | |
|---|---|---|
| EP | 0 988 488 B1 | 4/2004 |
| EP | 1 761 378 A1 | 3/2007 |
| FR | 2 737 548 A1 | 2/1997 |
| FR | 2 872 084 A1 | 12/2005 |
| GB | 839745 | 6/1960 |
| JP | 2001-191183 A | 7/2001 |
| WO | 94/15137 A1 | 7/1994 |
| WO | 2006/010815 A1 | 2/2006 |

OTHER PUBLICATIONS

"Schweissen Von Thermoplastischen Kunststoffen in der Serienfertigung Rotationsreibschweissen Anlagen, Verfahren, Merkmale," Feb. 1, 1994. DVS Richtlinie, XX, XX, XP008046287 *das ganze Dokument*.

DEVICE, ARRANGEMENT AND METHOD FOR CONNECTING LINES, MOTOR VEHICLE INCLUDING SUCH A DEVICE OR ARRANGEMENT, RESPECTIVELY

This application claims the benefit under 35 U.S.C. §120 of the filing date of U.S. patent application Ser. No. 11/235,088, filed Sep. 27, 2005, entitled DEVICE, ARRANGEMENT AND METHOD FOR CONNECTING LINES, MOTOR VEHICLE COMPRISING SUCH AN DEVICE OR ARRANGEMENT, RESPECTIVELY, which claims priority to German Patent Application No. 10 2004 046 797.8, filed Sep. 27, 2004, the entire contents of each of which is hereby incorporated herein by reference.

The invention relates to a device, an arrangement and a method for connecting lines, as well as to a motor vehicle comprising such a device or such an arrangement, respectively.

A device for connecting lines having at least one connection adapted to be joined with a line end by means of friction welding is known, for example, from EP 0 988 488 B1 incorporated herein by reference. As disclosed therein a plastic tube is axially pressed into engagement with a connector body to create a fluid connection. During the process an outer surface of the plastic tube frictionally engages a tapered portion of an outer flange of the connector body to melt the surfaces of the outer layer to establish an outer weldment zone. In addition, an inner layer of the plastic tube frictionally engages an inner flange of the connector body to create an inner weldment zone. The respective materials commingle and reharden to establish continuous concentric weldment zones and seal the connection.

The known device has the disadvantage that abrasion particles, which get into the interior of the line and contaminate the same, are formed when connecting the device with a line. The abrasion particles are formed by the emission of melt produced during friction welding which gets into the interior of the line in the form of a granulate.

Such contaminations are particularly harmful, especially when using fuel lines.

The invention is based on the object of providing a device, an arrangement and a method for connecting lines, wherein a contamination of lines, when connecting them by means of friction welding, can be avoided or at least reduced. Moreover, a motor vehicle comprising such a device or such an arrangement is to be provided.

The invention has the advantage that, by providing a means for withdrawing the melt producible by the friction welding from its area of origin, a controlled release of the melt is possible. By appropriately controlling the release of the melt, i.e. by a corresponding configuration of the means for withdrawing the melt, it can be prevented that melt escapes at the edges of the connector and gets into the interior of the line in the form of a granulate. The means for withdrawing the melt allows the formation of a directed movement of the melt, wherein the melt flow can be guided such that no melt gets to the edges of the connector where it can escape. Moreover, said means for withdrawing the melt may influence, especially reduce, the melt pressure, so that an uncontrolled spreading of the melt in the connecting region, due to the high pressures developing during the melt formation, can largely be avoided.

In contrast to the prior art, therefore, an uncontrolled and direction-wise undefined melt movement is, in accordance with the invention, avoided in that the connecting device comprises means for withdrawing the melt producible by the friction welding from its area of origin. Thus, it is possible to withdraw excess melt, which is not required for producing the welded joint, deliberately from the area of the origin of the melt such that this excess melt does not escape at the edges of the connector, especially at the edge of the connector disposed in the interior of the line.

With the invention, the abrasion particles formed during the friction welding can be avoided or at least reduced. This avoidance or reduction, respectively, represents a considerable enhancement of safety, especially in the field of automotive engineering, as the contaminations caused by the friction welding, which are harmful to the fuel lines, no longer occur or occur only to a smaller extent.

Moreover, the invention facilitates an automation of the manufacture of line connections by means of friction welding, as it is no longer required to clean the lines after the friction welding.

The connecting device preferably comprises at least one recess extending, at least section-wise, substantially in the longitudinal direction of the connector. The at least one recess extending substantially in the longitudinal direction of the connector allows a channeling for the excess melt withdrawn from the area of the origin of the melt. By said channeling, the melt pressure, on the one hand, may be reduced. On the other hand, the spreading direction of the melt may be controlled. In a solidified state, the melt, having flown into the recess, forms a joint between the connecting device and the line, so that the stability of the entire connecting device is increased.

According to another preferred embodiment of the invention the at least one recess extends parallel to the longitudinal direction of the connector. This embodiment of the invention allows a particularly easy manufacture of the device, as the recess extending parallel to the longitudinal direction of the connector can be easily manufactured by a corresponding injection molding or extrusion.

The at least one recess may also be extended, at an angle, to the longitudinal direction of the connector, whereby a longer flow path for the melt is formed, so that larger melt quantities can be withdrawn from the area of the origin of the melt, i.e. from the welding zone.

Furthermore, it is possible to form the at least one recess spirally. In this way an even longer flow path for the melt is obtained, so as to allow an even larger melt quantity to be withdrawn and received in the recess.

According to another preferred embodiment of the invention, two, three or four recesses are arranged to be equidistantly spaced apart on the circumference of the connector. The arrangement of several recesses allows the withdrawal of a larger melt quantity, with a uniform melt release being guaranteed due to the recesses being equidistantly spaced apart on the circumference of the connector.

The connecting device may comprise an inner connecting piece in the outer surface of which the at least one recess is provided. Alternatively, or in addition to this embodiment, the connector may comprise an outer connecting piece in the inner surface of which at least one recess is provided. This embodiment allows the implementation of the invention in different construction types of quick-connectors.

According to another preferred embodiment of the invention, the connecting device comprises at least one pocket-shaped recess connected with the area of origin for receiving the melt. The formation of at least one pocket-shaped formation is another possibility of withdrawing excess melt from the area of the origin of the melt, wherein the quantity of the withdrawn melt may be controlled by the volume of the pocket-shaped recess. The at least one pocket-shaped recess may be combined with the at least one recess extending substantially in the longitudinal direction of the connector.

According to another preferred embodiment of the invention, the connecting device comprises at least one radial opening connecting an interior space of a connector with an outer surface of the connector. During friction welding, air may escape from the interior space of the connector through said at least one radial opening, thus avoiding that the pressure in the interior space increases as a result of compressed air. Because of this pressure reduction, it is avoided that the melt is pressed out of the interior space. Moreover, excess melt not required for forming a welded joint, may be withdrawn from the interior space of the connector through the at least one radial opening, so that the melt pressure in the interior space decreases and at least the portion of the melt outwardly released through the at least one radial opening cannot get into the interior of the line.

The radial opening preferably connects, in the direction of insertion, a rear portion of the interior space of the connector with the outer surface thereof. Since the bulk of the melt should be formed especially in this rear portion of the interior space, excess melt may be withdrawn particularly effectively if the radial opening is provided in said rear portion.

It is useful, if several, especially two, three or four radial openings are arranged to be equidistantly spaced apart on the circumference of the connector, as this allows a uniform withdrawal of a larger melt quantity from the interior space of the connector towards the outside.

According to another preferred embodiment of the invention, the connecting device comprises means for controlling the area of the origin of the melt producible by the friction welding. By the combination of the deliberate withdrawal of excess melt with the control of the area of the origin of the melt producible by the friction welding it is avoided in a particularly effective manner that melt escapes at the edges of the connector and gets into the interior of the line. By controlling the area of the origin of the melt formed by the friction welding the melting position, i.e. the welding zone, may be locally displaced. By locally changing the weld in cooperation with the deliberate withdrawal of excess melt the area of the origin of the melt may be displaced to such positions in the connector which are favorable with respect to an avoidance of an escape of melt into the interior of the line, wherein a withdrawal of excess melt takes place simultaneously so as to ensure that this excess melt is passed to uncritical areas in the connector. Thus, the aimed at effect to prevent the escape of melt into the interior of the line is guaranteed even better.

The connecting device preferably comprises an inner connecting piece the outer surface of which is, at least sectionwise, provided with a lubricating agent. Alternatively or additionally, the connecting device may comprise an outer connecting piece the inner surface of which is, at least section-wise, provided with said lubricating agent. This allows to obtain a welding either only on the inner surface of the outer connecting piece or only on the outer surface of the inner connecting piece, if the respective other surface is provided with the lubricating agent, thus reducing the friction on this surface. Moreover, the respective surfaces may be provided with said lubricating agent only in parts, so that only the areas of the respective surfaces which are free of said lubricating agent are welded together due to the higher friction.

According to a preferred embodiment of the method according to the invention it may be provided that the melt, when being released, is channeled through at least one recess in the connecting device substantially in the longitudinal direction of said connector. By the channeling of the excess melt, an uncontrolled spreading of the melt at high pressure in the interior of the connector is prevented. The channeling rather achieves that the melt is guided in a predefined direction, with the melt pressure being reduced so that, altogether, the melt spreads less strongly. Thus, it is prevented that the melt escapes at the connector edges.

Alternatively, or in addition, it may be provided that the connector is aerated during the friction welding so as to reduce the pressure and prevent the melt from being pressed out of the connector.

Also, in view of the method, the withdrawal of excess melt from the area of the origin of the melt formed during the friction welding may be combined with controlling said area of origin. The so allowed local displacement of the melting area together with the deliberate withdrawal of the excess melt guarantees even more certainly that no melt escapes at the edges of the connector to the outside.

According to a preferred embodiment of the method according to the invention a contact pressure is produced between the line end and the connector substantially locally in the area of the origin of the melt. The deliberate generation of the contact pressure allows in an easy manner a local controlling of the area of the origin of the melt, so that the weld or the melting region, respectively, away from the critical locations stimulating the escape of melt toward less critical locations can be allowed.

According to another preferred embodiment of the method according to the invention the line end and the connecting device are joined in a first step by a substantially linear relative movement, wherein the line end and the connecting device are moved relative to each other up to a predefined position or until a predefined resistance is reached. In a second step, the line end and the connecting device are welded together by a substantially rotative relative movement under pressure. By the controlled linear movement of the line end and the connecting device relative to each other the location of the origin of the melt may be influenced. Moreover, also the melt quantity may be controlled by moving the line end and the connecting device relative to each other up to a predefined specific position. By deliberately adjusting said predefined position the melt quantity to be produced during the friction welding can precisely be controlled. Thus, it can even better be guaranteed that no melt escapes into the interior of the line, as only the quantity of welding deposit required for a sufficiently stable welded joint is produced.

Alternatively, it is possible to move the line end and the connecting device relative to each other until a predefined resistance, especially a predefined mechanical friction resistance, is obtained. The adjustment of this predefined resistance allows the regulation of the melt quantity such that the formation of a quantity required for a stable welded joint is allowed without producing a melt surplus, which possibly escapes into the interior of the line.

Due to the multiple stages of the method, i.e. the implementation of a substantially linear relative movement in a first step, followed by a substantially rotative relative movement in a second step, it is avoided that the line end is already molten when it is inserted in the connector. This multistage method rather stimulates a deliberate melting of the line end in the rear connection area, which forms—with respect to avoiding that melt escapes into the interior of the line—a favorable area. Moreover, the separation of the process steps joining and welding offers a greater flexibility for the implementation of the method, as the parameters of the individual steps are easier to influence, so that the method is altogether easier to control.

The substantially linear relative movement between the line end and the connecting device is preferably path-controlled. The path-controlled implementation of the linear relative movement between the line end and the connecting device allows a precise adjustment of the desired position of the line end with respect to the connecting device, or vice versa respectively, as production-dependent tolerances, especially with respect to linear dimensions or wall thicknesses of the components, may well be compensated by the path control.

The path control of the substantially linear relative movement may be accomplished in dependence on the wall thickness and/or the diameter of the line end. Thus, the process stability is improved as, by taking into account the wall thickness or the diameter of the line end, respectively, the melt quantity, which is variable as a consequence thereof, may be controlled. In particular, the distance defined by the path-controlled, substantially linear relative movement may be reduced with an increasing wall thickness of the line end. Since it has shown that also the quantity of welding deposit is increased with an increasing wall thickness, the welding deposit quantity may be reduced to a quantity sufficient and favorable for the safe implementation of the method by correspondingly reducing the distance traveled through within the scope of the linear relative movement.

According to another preferred embodiment of the method according to the invention a diameter of the line end is altered, especially increased, at least in the first step, so that compressive strains are generated in the line end, which cause a radially acting contact pressure. By altering the diameter correspondingly strong, the compressive strains generated in the line end and the contract pressure resulting therefrom, which again has an effect on the quantity of the welding deposit, may be controlled in a deliberate manner.

The alteration of the diameter of the line end may be accomplished along a curve-shaped path defined by the section of the connector. The curve-shaped form of the diameter alteration, caused by the corresponding section of the connector, avoids the formation of stress peaks in the material of the line end and, thus, a locally undesired formation of melt especially in the transitional region from the smaller diameter to the larger diameter of the connector.

In certain cases it has proved to be favorable if, in the first step, the substantially linear relative movement is superimposed with a rotative relative movement for warming up the line end and the connector. By deliberately warming up the line end, the expansion behavior thereof can be influenced so as to even better avoid the formation of undesired stress peaks in the material of the line end. Furthermore, the radial contact pressure is controlled by adjusting a certain warming-up temperature, which results in a further possibility of influencing the production of the melt quantity.

According to another preferred embodiment of the invention the diameter of the line end is altered, especially increased, prior to joining it with the connector of the connecting device. By expanding the line end prior to plugging the line end and the connector together the formation of stress peaks in the material of the line end can be avoided. The alteration of the diameter of the line end prior to joining it with the connector of the connecting device may be combined with the aforementioned embodiments. It is, for example, possible to alter the diameter of the line end and to perform the multistage method for connecting the line with the connecting device afterwards.

Furthermore, it is possible to form different diameters in the longitudinal direction of the line end when altering the diameter of the line end. The diameters differently formed in the longitudinal direction of the line end make it possible that certain areas of the connector be deliberately supplied with a suited contact pressure defined by the respective diameter.

It has proved to be useful in certain cases that the diameter of the line end is increased such that the diameter of an outer surface of the line end is formed to be slightly larger than the diameter of an inner surface of the connector coming into contact with the outer surface of the line end. This allows a welding of the outer surface of the line end with the inner surface of the connector.

Another possibility of controlling the area of the origin of the melt formed during the friction welding may be obtained in accordance with another embodiment of the invention by that contact surfaces of the line end and/or the connector are at least section-wise provided with a lubricating agent. In this manner, the friction between the connector and the line end is reduced locally in those areas in which the formation of melt is to be avoided.

Below, the invention will be explained in an exemplary manner by means of schematic drawings and with further details.

Figure 1:
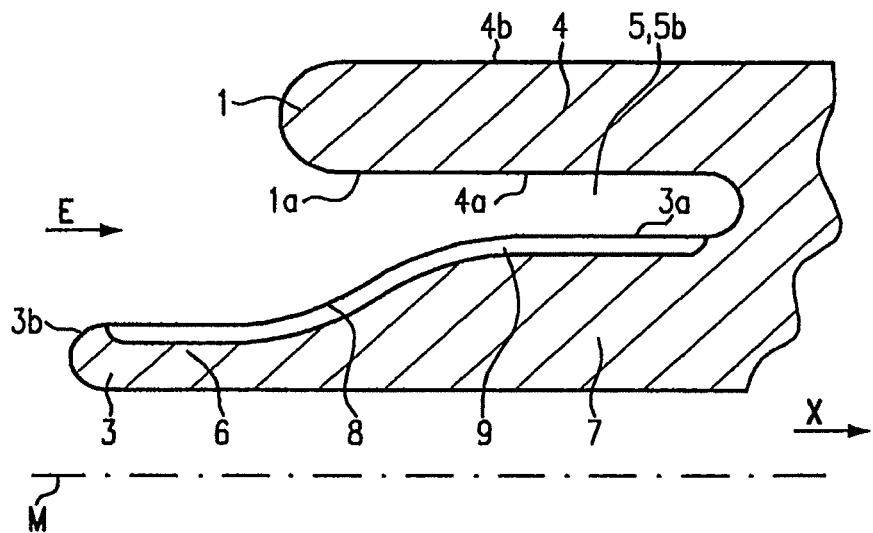
FIG. 1 shows a partial section in the longitudinal direction of an embodiment of an device according to the invention comprising a connector provided with a recess.
Figure 2:
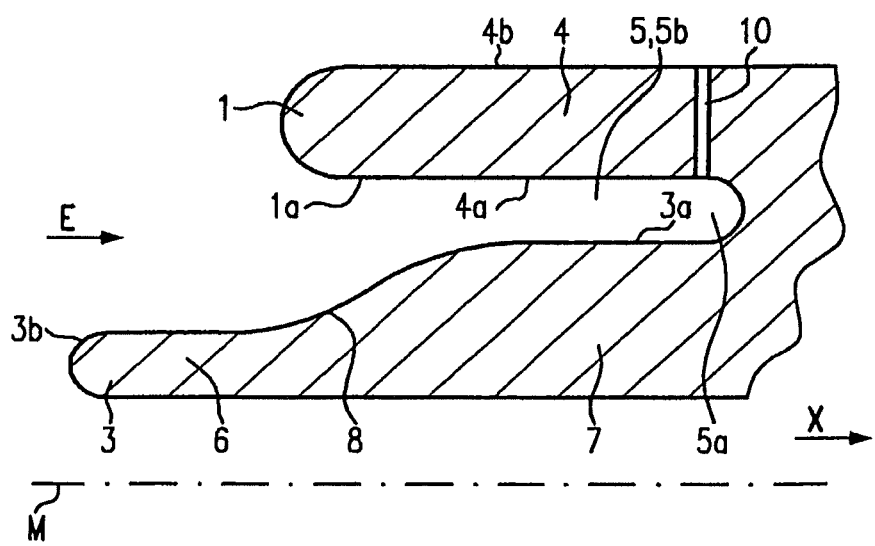
FIG. 2 shows a partial section in the longitudinal direction of another embodiment of the device according to the invention, wherein the connector comprises a radial opening.

The connecting device, illustrated in FIGS. 1, 2 is shown section-wise, namely in the area of connector 1 of the connecting device. The connecting device is formed rotationally symmetrical with respect to the center axis M, whereby the cross-sectional region of the connecting device arranged underneath the center axis M and not illustrated in FIGS. 1, 2 corresponds to the cross-sectional area illustrated in FIGS. 1, 2.

The connecting device comprises a further, not illustrated, connector arranged in the longitudinal direction X of the connecting device coaxially opposite to the connector 1. The connector 1 comprises an inner connecting piece 3 and an outer connecting piece 4 arranged substantially concentrically to the inner connecting piece 3. An annular groove 5 for receiving a line end 2 of a line to be connected is formed between the inner connecting piece 3 and the outer connecting piece 4. The inner connecting piece 3 is formed to comprise an entry section 6 and a retention section 7, with the diameter of the retention area 7 being larger than the diameter of the feeding area 6. The feeding area 6 is arranged in front of the retention area in the insertion direction or plug-in direction E of the line end 2. The feeding area 6 serves to guide the line end 2 when plugging the line end 2 onto the connector 1. The welded joint produced by the friction welding is arranged in the retention area 7, which constitutes the area responsible for securely joining the connector 1 and the line end.

A transitional region 8, which compensates the diameter difference between the feeding area 6 and the retention area 7, is provided between the feeding area 6 and the retention area 7. It is shown in FIGS. 1, 2 that this transitional area 8 is curve-shaped.

In view of the further development of the connecting device shown in FIGS. 1, 2 reference is made to the German patent application of the applicant with the application number 10 2004 027 831.8.

This connecting device is particularly provided to connect fuel lines in motor vehicles, but may also be applied in other technical fields where a secure connection of lines for the transport of liquid or gaseous media is important.

The connection of the line end 2 with the connector 1 of the connecting device, i.e. the quick connector, is accomplished by means of friction welding. The term "connection of lines" thereby refers to both the connection of a single line with the connector of the quick connector and the connection of at least two lines by means of the quick connector, which is firmly joined with one line end by means of friction welding on one connection side and, on the other connection side, is fixed with another line end, e.g. by means of a clip not illustrated.

One possibility to realize the means for withdrawing the melt producible by the friction welding form the area of origin consists in providing, as is shown in FIG. 1, a recess 9 in the connector, which is extended at least section-wise substantially in the longitudinal direction X of the connecting device. The longitudinal recess 9 is, for example, formed as a groove or furrow having a U-shaped or V-shaped cross-section. Other cross-sectional geometries are likewise possible.

The recess 9 is formed in the outer surface 3a of the inner connecting piece 3 and extends substantially over the entire length of the inner connecting piece 3. In the example depicted in FIG. 1, the recess 9 ends slightly ahead of the closing edge 3b of the inner connecting piece, so that a barrier is created as a protection which prevents that melt escapes at the closing edge 3b into the interior of the line.

It is also possible to guide the recess 9 up to the closing edge 3b, so that the recess 9 extends over the entire length of the inner connecting piece 3. It has shown that the melt in the recess 9 does not flow up to the closing edge 3b, but ends with a sufficiently large distance ahead of the closing edge 3b. The extension of the recesses 9 over the entire length of the inner connecting piece 3 facilitates the production of the device by means of injection molding or extrusion.

The recess 9 is adapted to the curve-shaped section of the inner connecting piece 3 and extends along the contoured surface of the inner connecting piece 3.

In the example depicted in FIG. 1, the recess 9 extends up to the base of the annular groove 5 and therefore is partially arranged in the interior space 5b of the connector 1 provided to receive the line end 2 not illustrated. Due to the recess 9 extending up to the base of the annular groove 5 it is ensured that the recess 9 is in communication with the area of the origin of the melt, i.e. with the welding region, and can provide for a withdrawal of excess melt.

The recess 9 shown in FIG. 1 extends parallel to the longitudinal direction X of the connector. It is also possible to dispose the recess 9 at an angle to the longitudinal direction X of the connector 1, so that a longer distance is available for the discharge of the excess melt from the melting area. By forming the recess 9 in a spiral manner this distance may even be lengthened further.

It is possible to provide only one single recess 9 in the connector. For an even withdrawal of excess melt it is useful to provide, three or four recesses 9 which are arranged to be equidistantly spaced apart on the circumference of the connector. A larger number of recesses 9 is likewise possible.

The recess 9 may, alternatively or in addition to the recess 9 provided in the inner connecting piece 3, be formed in the inner surface 4a of the outer connecting piece 4.

The invention is not limited to the structural shape of the connecting device depicted in FIG. 1, but may also be realized in connecting device, especially quick connectors, with different geometries.

The effect of the at least one recess 9 consists in the withdrawal of excess melt from the welding zone in a controlled manner, i.e. a predeterminable direction, so that an uncontrolled and undefinable spreading of the melt in the connector 1 between the non-illustrated line end 2 and the inner connecting piece 3 or, respectively, the outer connecting piece 4 is prevented. By the controlled withdrawal of melt and the inherent enlargement of the flow cross-section a reduction of the melt pressure is achieved, so that the excess melt flowing in the recess 9 cannot get up to the closing edge 3b and, thus, into the interior of the line. The draining off melt rather ends with a distance ahead of the closing edge 3b and solidifies in the at least one recess 9. The joint between the inner connecting piece and the line end thus formed along the recess 9 contributes to an increased stability of the entire connection.

It has surprisingly shown that the extension of the recess 9 in the direction of the closing edge 3b of the connector 1 leads to the aimed at effect, namely a prevention of the escape of melt, especially at the closing edge 3b, although the excess melt in the recess 9 is passed in the direction of the closing edge 3b. This is due to the fact that the length of the recess 9 is dimensioned such that the excess melt cannot reach the end of the recess 9. The tests required for this may be easily determined by the person skilled in the art in dependence on the geometry of the respective quick connector.

Moreover, it is possible to form at least one, non-illustrated pocket-shaped recess, e.g. in the outer surface 3a of the inner connecting piece 3, such that this pocket-shaped recess communicates with the melting area. Thus, it is obtained that excess melt produced during the friction welding gets into the pocket-shaped recess and is therefore withdrawn from the area of the origin of the melt in a controlled manner. A combination of the pocket-shaped recess with the longitudinal recess 9 depicted in FIG. 1 is likewise possible. The pocket-shaped recess could, for example, be formed in the proximity of the closing edge 3b in the inner connecting piece 3 and be connected with the recess 9. The recess 9 would then have a pocket-shaped widening extended in the circumferential direction of the connector 1 at the end on the side of the closing edge, which serves as melt reservoir and can receive excess melt reaching up to the end of the recess 9 on the side of the closing edge. This pocket-shaped recess or widening thus constitutes another protection against the undesired escape of melt at the closing edge 3b.

The recess 9 extending substantially in the longitudinal direction X of the connector 1 means that the recess 9 comprises at least one extension component or direction component, respectively, which extends in the longitudinal direction X. Accordingly, for example, also a recess 9 extending diagonal to the longitudinal direction X extends substantially in the longitudinal direction X of the connector, as the locus curve of the diagonal recess 9, relative to the longitudinal direction X, has one component extending in the longitudinal direction X and one component extending in the circumferential direction of the connector. The same applies to a spiral recess 9, which likewise has a direction component extending in the longitudinal direction X.

In accordance with the embodiment illustrated in FIG. 2 the connector 1 comprises at least one radial opening 10 to connect the interior space 5b with an outer surface 4b of the connector 1. In the embodiment shown in FIG. 2, the interior space 5b corresponds to the annular groove 5 between the inner connecting piece 3 and the outer connecting piece 4. The radial opening 10 shown in FIG. 2 may be arranged in a diagonal manner, so that at least one direction component of the opening extends in a radial manner.

The radial opening 10 connects a, in the direction of insertion E, rear portion 5a of the interior space 5 of the connector 1 with the outer surface 4b and, thus, with the surroundings. It is also possible to arrange the radial opening 10 at another location of the connector 1, e.g. approximately in the center of the outer connecting piece 4 or approximately on the height of the transition 8 between the insertion area 6 and the retention area 7. Moreover, also several radial openings 10 arranged in the longitudinal direction X of the connector 1 may be formed.

The connector 1 shown in FIG. 2 may comprise two, three or four or several radial openings 10, which are arranged to be equidistantly spaced apart on the circumference of the connector. Moreover, it is possible to form several, circumferentially arranged radial openings 10 in the longitudinal direction X of connector 1, so that the outer connecting piece 4 comprises several rows of openings which are arranged, for example, in parallel. The radial openings 10 may be bores with a circular cross-section. Other opening geometries are likewise possible.

The radial opening 10 effects an aeration of the interior space 5b of the connector 1 during the friction welding, wherein air compressed as result of the melt formation in the interior space 5b may escape outwardly to the environment. Thus, it is avoided that this compressed air presses the melt formed in the melting area in the direction of the closing edge 3b.

Furthermore, excess melt rises upwards in the radial opening 10 and is thus effectively withdrawn from the melting area. By appropriately choosing the number of radial openings 10 the withdrawn quantity of the excess melt may be regulated. The several radial openings 10 distributed over the circumference of the connector 1 in an equidistantly spaced apart manner effects a uniform pressure release of the interior space 5b.

The excess melt, which reaches the outer surface 4b of the outer connecting piece 4 through the radial openings 10, is optically visible and offers the possibility of a visual inspection of the welded joint.

The embodiments shown in FIGS. 1 and 2, as well as the above-explained variations of the embodiments, may be combined with each other.

Moreover, it is possible to form the recess 9 shown in FIG. 1 not in the quick connector, but in an inner surface and/or outer surface of the line end to be connected. Also a combination of a so-contoured line with the connectors 1 shown in FIG. 1, 2 is possible. Thus, an arrangement for connecting lines is created which comprises a quick connector or a connecting device, respectively, for lines as well as a line with a line end, which effectively prevents an escape of melt at the closing edge 3b of the inner connecting piece 3.

With the method for connecting lines, the melt formed during the friction welding is withdrawn from its area of origin in a controlled, i.e. deliberate manner, wherein the melt is especially channeled during the withdrawal. This can, for example, be done by conducting the excess melt through the at least one recess 9, as shown in FIG. 1, in the connector 1 substantially in the longitudinal direction of connector 1. Another possibility to withdraw the melt from the melting area in a controlled manner can be to aerate the connector 1 during the friction welding so as to reduce the pressure, which may be accomplished by means of the connector 1 shown in FIG. 2 and the radial opening 10 formed in the same. The effect obtainable by the controlled release of the excess melt formed during the friction welding from the welding zone may be enhanced by that the formation of the area of the origin of the melt is controlled, especially locally displaced. Thus, it is possible to displace the area of the origin of the melt to a location of the connector 1 being uncritical with respect to the avoidance of a melt escape into the interior of the line and, at the same time, to withdraw the excess melt formed during the friction welding in a controlled manner, so that the risk that the melt gets into the interior of the line is altogether reduced.

By controlling the area of the origin of the melt formed during the friction welding the local position of the location of the melt formation is deliberately changed. This means that the location of the melt formation is displaced, for example, in the insertion direction E backwards into a rear portion of the retention area 7. The term "controlling" thereby means both controlling the method by an open signal circuit and controlling the method by a closed signal circuit, where the controlled output quantity retroacts on the input quantity to be controlled.

Moreover, the control of the area of the origin of the melt formed during the friction welding may imply a change of the area boundaries in the sense that the area of the origin of the melt is changed, especially limited, with respect to its surface measure. Insofar a smaller area with respect to the surface measure thereof may be adjusted by controlling the area of the origin of the melt as compared to an uncontrolled method.

By changing the local position of the area of the origin of the melt in a controlled manner, as well as by limiting the area of origin with respect to the surface measure thereof, it can be avoided that the melt gets into the interior of the line between the inner side of the line end 2 and the outer surface of the inner connecting piece, where it causes a contamination of the line in the form of granulate or abrasion particles, respectively. By controlling the area of origin it is particularly possible to displace the melt formed during the friction welding either to a location of the connector 1 being uncritical in view of the undesired melt escape, or to limit the area of the origin of the melt with respect to its surface measure such that only the quantity of welding deposit required for a sufficiently stable welded joint is produced.

The controlling of the area of the origin of the melt can, for example, take place by generating the contact pressure between the line end 2 and the connector 1 substantially locally in the area of the origin of the melt. By deliberately supplying specific areas of the connector 1 with the contact pressure it is achieved that a welding takes place mainly in these areas.

Figure 3:
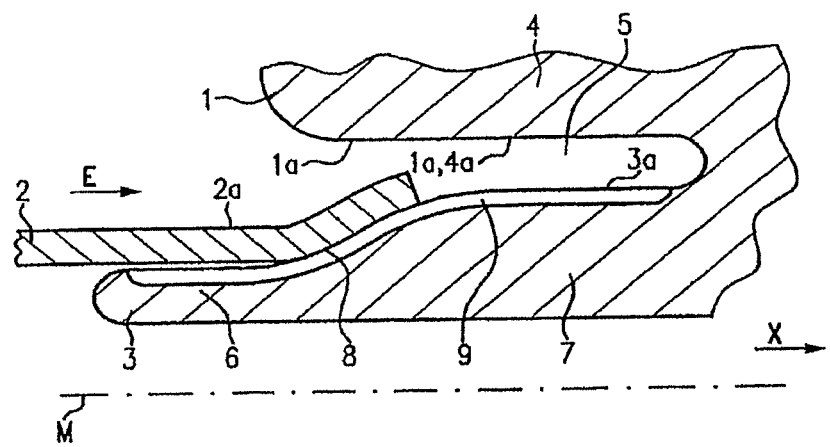
FIG. 3 shows the embodiment of FIG. 1, wherein a line end is inserted into the corrector.
Figure 4:
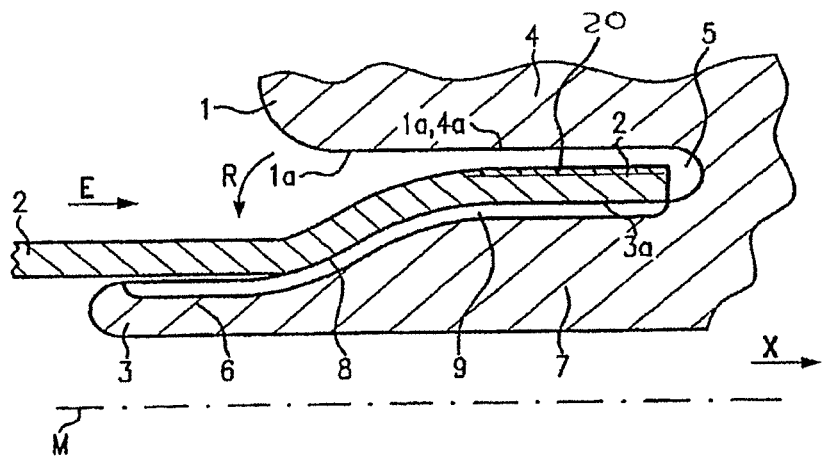
FIG. 4 shows the embodiment of FIG. 1, wherein the line end is brought into the position intended for the friction welding.
Figure 5:
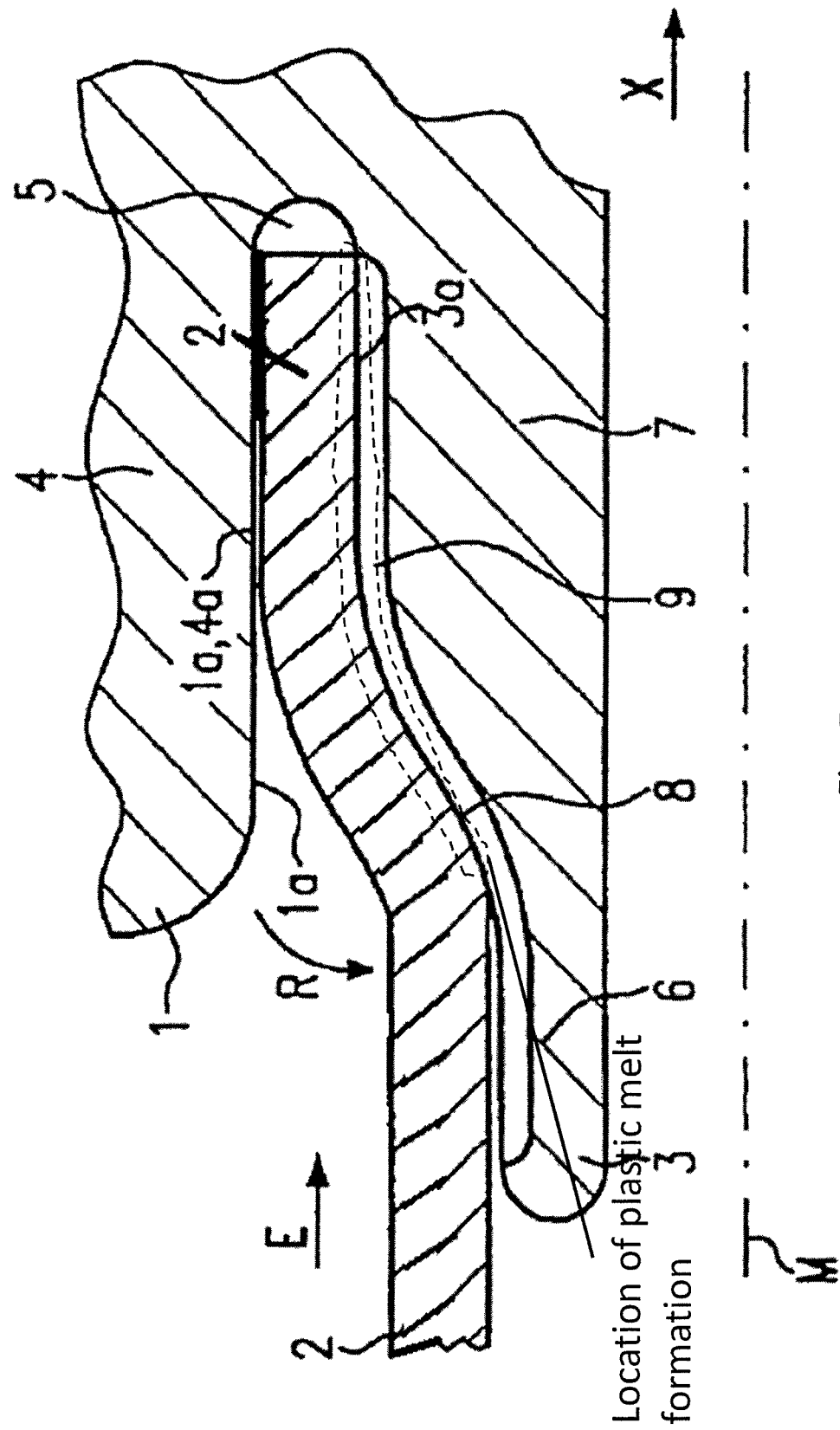
FIG. 5 shows the location of plastic melt formation.

A concrete possibility of controlling the area of the origin of the melt formed during the friction welding is allowed by the sequence of connection steps according to a preferred embodiment of the invention, which is illustrated in FIGS. 3, 4 by way of an example.

In FIG. 3 it is shown that, in a first step, the line end 2 and the connector 1 are joined by a substantially linear relative movement. The insertion direction is designated with the arrow E, wherein the invention is not restricted to the direction of inserting the line end 2 as shown. It is rather also possible to hold the line end 2 stationary and to move the connector 1 opposite to the insertion direction E shown in FIG. 1, so that a substantially linear relative movement between both components takes place.

In the first step as shown in FIG. 3, the line end 2 and the connector 1 are moved relative to each other until a predefined position or predefined resistance is reached, whereby the area of the origin of the melt formed during the friction welding in the subsequent second step is controlled.

In general, the control of the area of the origin of the melt is accomplished by a defined, controlled insertion of the line end 2 into the connector 1, whereby a predefined distance is covered. For determining this predefined distance different control quantities may be used. It is, for example, possible to measure the covered distance or the position of the line end with respect to the connection device, or vice versa. Furthermore, it is possible to determine the desired distance by measuring the mechanical frictional resistance between the line end 2 and the connector 1, since this resistance increases with an increasing distance. Moreover, it is possible to control the method by time.

After the line end 2 and connector 1 have been plugged into each other by the linear relative movement and, thus, are provisionally mechanically fixed, frictional heat between both components, which are thus welded together, is generated in the second process step shown in FIG. 2 by a rotative relative movement between the line end 2 and the connector 1.

To prevent the line end from already melting in the first step when it is inserted into the connector 1, the linear relative movement during the first process step is performed so slowly and with such a small pressure that no fusing of the line end 2 will occur. Only in the second step, when the rotative relative movement between the line end 2 and the connector 1 is performed, the speed, i.e. the rotational speed, and the pressure, are deliberately increased such that the welding of the line end 2 with the connector 1 takes place only during the second phase of the method, i.e. during the second step (FIG. 2). By separating the two process steps inserting and welding together it is achieved, on the one hand, that the melt is formed exclusively in the area intended for this purpose, namely in the retention area 7, and not already in the front feeding area 6. This process control helps to prevent the melt from escaping between the inner connecting piece 3 and the line end 2 and from reaching the line end.

The different possibilities for determining the insertion depth, i.e. the distance defined by the linear relative movement between the line end 2 and the connector 1, will be explained below.

For determining the respective insertion depth, i.e. distance, the specific geometries of the quick connector and the line end 2, respectively, as used in the method have to be taken into account. It generally applies that the maximum insertion depth is limited by the welding deposit quantity required for a sufficiently stable welded joint. If the line end is inserted too deeply, too much melt is produced which escapes into the interior of the line and entails the undesired contaminations. In most cases of application it should be avoided that the line end is inserted up to the stop, i.e. the base of the annular groove 5, since the formed melt quantity in this case is too large.

The minimum insertion depth substantially determines the stability of the welded joint, since the formed melt quantity decreases with a smaller insertion depth, so that there is less weld deposit available for producing the welded joint.

The minimum and the maximum insertion depths are geometry-dependent and may be determined by tests for the respective quick connector or, respectively, the respective combination of quick connector with line end. The insertion depth, i.e. the distance determined by the linear relative movement, depends for example on the wall thickness of the pipe to be connected or, respectively, of the line to be connected. Therefore, it is considered when determining the minimum and maximum insertion depth as to whether the line to be connected has a large or a small wall thickness.

In the case of a line having a thick wall, e.g. having a wall thickness of approximately 1.1 mm, a contact pressure high enough for the friction welding is already created in the front portion of the retention area 7, so that a process-stable welding range, which ensures sufficient stability by simultaneously avoiding the escape of melt, is achieved with a smaller insertion depth as compared to a thinner-walled line having a wall thickness, e.g. of 0.9 mm.

With such a thin-walled line having a wall thickness of approximately 0.9 mm a larger insertion depth has to be selected so as to obtain a sufficient stability of the weld joint. Since less melt is formed with thinner-walled lines, the maximum insertion depth increases, so that altogether a deeper insertion of the line end with thinner-walled pipes into the connector 1 is possible without the occurrence of a melt escape into the interior of the line.

With both thick-walled and thin-walled lines the respective optimum range for the insertion depth has to be determined in dependence on the respective geometry of the quick connector (e.g. diameter of the retention area 7 or gradient of the transitional area 8), which guarantees a process-stable welding of the components in view of the avoidance of the contamination of the interior of the line and the stability of the joint.

Another possibility of determining the insertion depth, i.e. the distance, is the measurement of the mechanical friction resistance between the line end 2 and the connector 1. Other possibilities of determining this distance are conceivable. For example, the insertion time could be determined. The controlling of the path has the advantage, however, that production-dependent tolerances, especially the linear dimensions of the line or the quick connector, respectively, can be taken into account, so that a precise control of the area of the origin of the melt is allowed.

With the determination of the insertion depth or, respectively, the process-stable range of the insertion depth also material parameters of the respectively used materials may be considered. For example, the material density, the thermal diffusivity, the thermal conductivity, the heat transfer coefficient, the specific thermal capacity, the heat penetration factor and the longitudinal expansion coefficient may be taken into account.

Another additional possibility of controlling the area of the origin of the melt consists in altering, especially in increasing, the diameter of the line end in a first process step, i.e. when sliding the line end 2 onto the connector 1. The alteration of the diameter of the line end 2 thereby takes place along a curve-shaped path which is defined by the section of the connector 1, as is illustrated in FIGS. 3, 4. Due to the deformation of the line end along a curve-shaped path stress peaks in the material of the line end and thus an undesired formation of melt in the transitional area 8 or in the front portion of the retention area 7 adjacent the transitional area 8, respectively, are avoided.

By altering the diameter of the line end along the curve-shaped path together with the slow insertion of the line end 2 into the connector 1 it is especially achieved that, especially with thicker-walled lines, the formation of melt in the front portion of the retention area 7 or in the transitional area 8, respectively, is prevented, so that the melt is mainly formed in the rear portion of the retention area 7 which is comparatively uncritical with respect to the undesired melt escape.

The linear relative movement performed in the first step may be superimposed with a rotative relative movement, whereby the line end and the connector, respectively are warmed up. Thus, it is achieved that comparatively more welding deposit is produced during the friction welding, so that the stability of the weld joint can be increased. Moreover, the expansion behavior of the line end 2 and the compressive strains producible in the material are influenced by the warm-up, so that it is possible to control the contact pressure.

Another possibility of controlling the area of the origin of the melt formed during the friction welding consists in altering, especially increasing, the diameter of the line end 2 prior to joining it with the connector 1 of the connecting device, i.e. prior to performing the first step. On the one hand, the effect of avoiding stress peaks in the material can thus be increased, so that the formation of melt at undesired locations, especially in the proximity of the feeding area 6, can be avoided.

Moreover, by appropriately expanding the line end 2 by means of a mandrel not illustrated in FIGS. 3, 4 the diameter of the line end 2 can be increased such that the diameter of an outer surface 2a of the line end 2 is formed to be slightly larger than the diameter of an inner surface 1a of the connector 1 coming into contact with the outer surface 2a of the line end 2. This means that, by correspondingly expanding the line end 2, the inner surface 4a of the outer connecting piece 4 is supplied with a contact pressure by the expanded line end 2, so that a welded joint can be produced by a rotative relative movement between the outer surface 2a of the line end 2 and the inner surface 4a of the outer connecting piece 4.

In contrast to the embodiment illustrated in FIG. 4 the line end 2 is therefore not adjacent to the inner connecting piece 3, but to the outer connecting piece 4. The melt formed during the friction welding is produced in the contact area between the outer surface 2a of the line end 2 and the inner surface 4a of the outer connecting piece. Thus, it is achieved that a possibly formed excess melt 20 escapes into the free space between the line end 2 and the outer connecting piece 4 and does not penetrate into the interior of the line. This embodiment of the method according to the invention provides for an improved process safety.

Furthermore, it is possible to impress a specific shape to the line end 2 during the expansion, whereby different compressive strains are induced in the material of the line end 2 which result in a favorable contact behavior of the line end 2.

The line end 2 could, for example, be deformed such that the diameter in the outlet portion of the line end 2 (rear end of the line in the insertion direction E) is formed to be slightly smaller than the diameter in a, in the insertion direction E, front portion of the line end 2. Thus, the line end 2 has a slightly conical shape tapering in the insertion direction E. By the conical shape of the line end 2 it is achieved that the contact pressure of the line end 2 onto the retention area 7 increases in the insertion direction E and attains its maximum value at the smallest diameter position of the conically shaped line end 2, i.e. in the rear portion of the retention area 7. Thus, the formation of melt during the friction welding is stimulated in the rear portion of the retention area 7.

The process step to expand the line end 2 prior to the insertion into the outer connecting piece 4 may be combined with the above-explained embodiments.

In addition, the area of the origin of the melt may be controlled by providing the outer surface 3a of the inner connecting piece 3 or the inner surface 4a of the outer connecting piece 4 with a lubricating agent. This embodiment is particularly suited for a combination of line end 2 and connector 1, where both sides of the line end 2 abut against the inner connecting piece 3 and the outer connecting piece 4 respectively. By applying a lubricating agent onto one of said two contact surfaces of the inner connecting piece 3 and the outer connecting piece 4 it is achieved that one, advantageously the inner surface 4a of the outer connecting piece 4, is warmed up by the frictional forces, so that a welding takes place only on this surface not provided with the lubricating agent.

Moreover, it is possible to provide critical sections of the respective contact area between the line end 2 and the connector 1, e.g. the transitional area 8 and the front portion of the retention area 7 adjacent to the transitional area 8, with said lubricating agent. In this way, too, it is prevented that melt is formed in critical areas, so that the formation of the melt is limited to sections uncritical with respect to the melt escape.

A combination of the above-explained embodiments is possible. For example, the line end may be expanded prior to the first step of the multistage method, whereby the transitional area 8 and the front portion of the retention area 7 adjacent to the transitional area 8 are provided with the lubricating agent.

As is depicted in FIGS. 3, 4 a connector 1 provided with a means for withdrawing excess melt is used in the method. This connector 1 corresponds to the connector 1 shown in FIG. 1. The use of the other connecting device and, respectively, quick connectors as disclosed is likewise possible.

Without being limited thereto, the invention is especially suited for connecting fuel lines, since the formation of welding beads, which get into the interior of the line, can be effectively avoided or at least reduced by means of the invention.

The invention claimed is:

1. Method for connecting a line, comprising:
   joining a plastic line end with a connector of a line connecting device by friction welding;
   guiding plastic melt formed during the friction welding away from the connector in a predetermined direction, wherein the plastic melt is guided through at least one radial opening in the connector, wherein the at least one radial opening connects an interior space of the connector with an outer surface of the connector;
   wherein the connector is aerated through the at least one radial opening during the friction welding so as to reduce pressure.

2. Method according to claim 1, wherein the plastic melt is guided through at least one recess in the connector substantially in a longitudinal direction of the connector.

3. Method according to claim 1, comprising:
   locally displacing the location of plastic melt formation during the friction welding.

4. Method according to claim 3, wherein a pressure is generated between the line end and the connector at the location of plastic melt formation.

5. Method according to claim 3, comprising:
   joining the line end and the connector in a first step by a substantially linear relative movement, wherein the line end and the connector are moved relative to each other up to a predefined position or until a predefined resistance is reached; and
   welding the line end and the connector together under pressure in a second step by a substantially rotative relative movement.

6. Method according to claim 5, wherein the substantially linear relative movement is path-controlled.

7. Method according to claim 6, wherein the path-control of the substantially linear relative movement takes place in dependence on a wall thickness and/or a diameter of the line end.

8. Method according to claim 7, wherein a distance determined by the path-controlled, substantially linear relative movement is reduced with an increasing wall thickness of the line end.

9. Method according to claim 5, wherein a diameter of the line end is altered during the joining.

10. Method according to claim 9, wherein the alteration of the diameter of the line end takes place along a curve-shaped path determined by a section of the connector.

11. Method according to claim 5, wherein the substantially linear relative movement is superimposed with a rotative relative movement in the joining to warm the line end and the connector.

12. Method according to claim 3, wherein a diameter of the line end is altered prior to joining it with the connector of the connecting device.

13. Method according to claim 12, wherein different diameters are formed in a longitudinal direction of the line end when altering the diameter of the line end.

14. Method according to claim 12, wherein the diameter of the line end is increased such that a diameter of an outer surface of the line end is formed to be slightly larger than a diameter of an inner surface of the connector coming into contact with the outer surface of the line end.

15. Method according to claim 3, wherein contact surfaces of the line end and/or the connector are at least section-wise provided with a lubricating agent.

* * * * *